United States Patent Office 2,842,016
Patented July 8, 1958

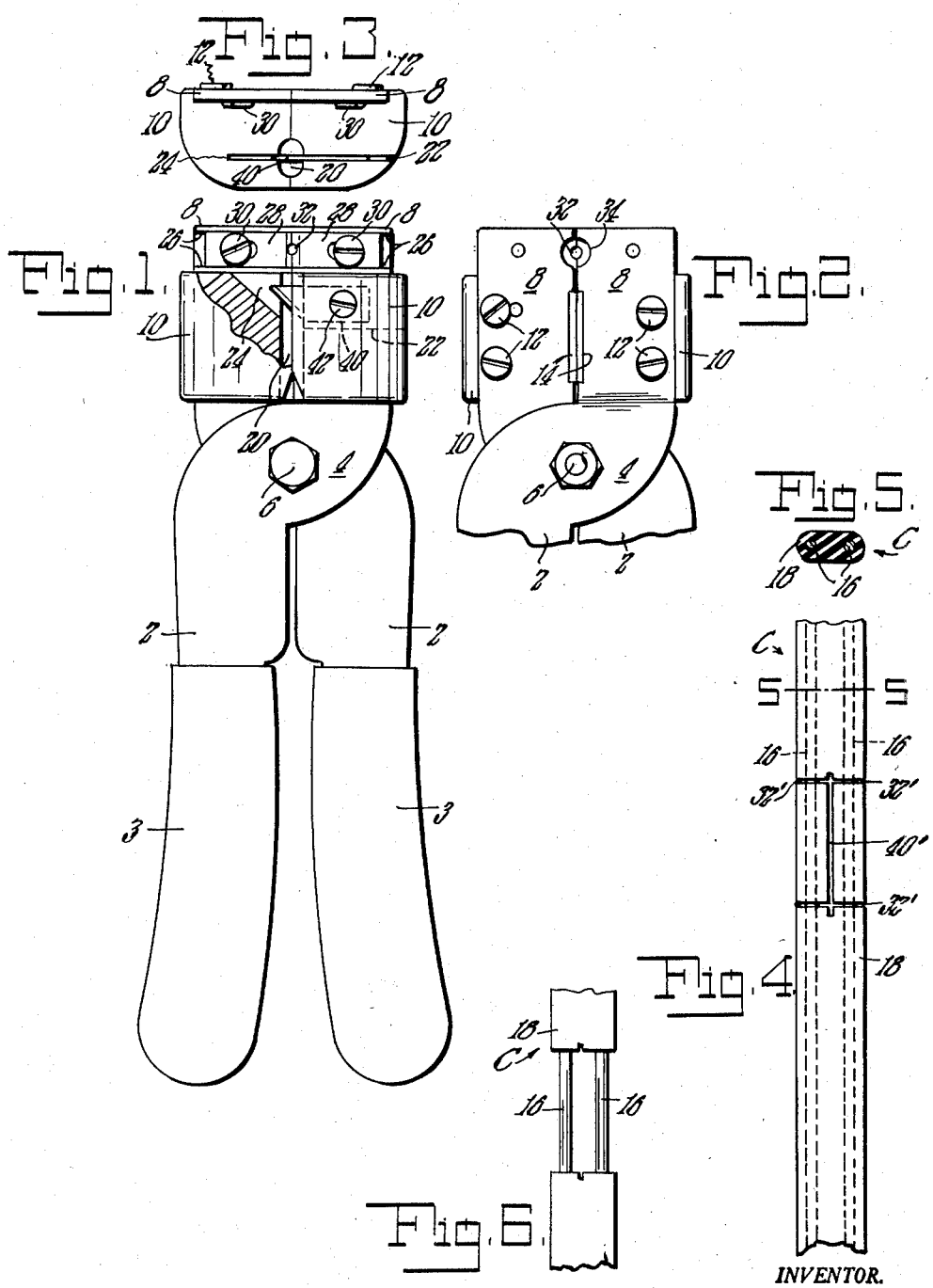

2,842,016

CABLE DRESSING TOOL

Kenneth T. Miller, Longmeadow, Mass.

Application September 10, 1956, Serial No. 608,864

2 Claims. (Cl. 81—9.5)

This invention relates to improvements in a tool for dressing cable or stripping the conductors thereof for connecting other circuit conductors thereto.

The principal object of the invention is directed to the provision of a tool adapted to facilitate the removal of insulation or covering from a pair of conductors of a cable which is of a type well known for use in telephone systems and the like and consists of a pair of separate conductors encased in insulation and held in transversely spaced parallel relation.

It often is necessary and desired to connect wires to the conductors at points along the cable. For this purpose, the conductors must be dressed or bared but is a difficult and time consuming operation, at best.

According to the novel features of the invention, a tool is provided to facilitate removal of insulation from the conductors of the cable at the desired points along the cable.

In a broad way, the tool of the invention is constructed and arranged to slit or cut the insulation of the cable longitudinally thereof midway between the conductors and to cut the insulation adjacent the ends of the longitudinal slit or cut transversely through to said conductors. The insulation on each conductor between the transverse cuts may be readily and easily removed.

The length of the longitudinal slit and distance between the cuts may be such as will provide the length of bared conductors desired and necessary.

Various changes and modifications may be made in the form of a tool embodying the novel features of the invention without departing from the spirit and scope thereof. Said tool is shown in the form at present preferred, wherein;

Fig. 1, is a plan view of a tool embodying the novel features of the invention;

Fig. 2, is an inverted plan view of the upper jaw end portion of the tool shown in Fig. 1;

Fig. 3, is an end elevational view of the jaw end of the tool shown in Figs. 1 and 2;

Fig. 4, is a plan view of a section of dual conductor cable;

Fig. 5, is a transverse sectional view through the cable, on the line 5—5 of Fig. 4; and Fig. 6, is a plan view of a section of cable showing the conductors thereof as they are dressed or bared.

Referring now to drawings more in detail, the novel features of the invention will be described.

A pair of members, preferably formed from flat metal stock, have lower grips or handles 2, and intermediate portions 4 in superposed relation. The handles may be sheathed in such insulating or covering material, indicated by 3, as may be desired.

The portions 4 are pivoted as by a bolt 6, or the like. Jaw forming portions 8 are offset sidewise relative to their respective handles. One of said jaw forming portions is offset relative to the plane of its handle so that the jaw forming portions are disposed in the same plane, as in Fig. 3.

Blocks 10 are secured to corresponding faces of the jaw portions by screws 12 or the like. The jaw portions 8 and the blocks 10 form what will be called jaws and are opened and closed by the swinging of the handles 2.

Inner adjacent edges of the jaw portions 8 and inner adjacent faces of the blocks 10 are arranged for abutment in the closed position of the jaws, as shown in Figs. 1, 2 and 3.

The inner adjacent edges of the jaw portions 8 are cut away to receive lips 14 of the blocks which are disposed at inner adjacent sides of said blocks, as in Fig. 2.

A cable is represented by C in Figs. 4, 5 and 6. As shown, a pair of conductors 16 are encased, in transversely spaced parallel relation, in insulation or covering material 18.

Inner faces of the jaws or jaw blocks are provided with longitudinally extending grooves, which provide an elongated channel 20 in the closed position of the jaws, as shown in Fig. 3.

The blocks 10 are provided with slots 22 and 24 which extend downwardly from their upper sides and intersect the channel 20. Said slots are disposed in planes transverse to the longitudinal axis of the pivot bolt 6.

Upper ends of the jaw portions 8 outwardly of the blocks 10 are provided with transversely extending guideways 26, see Fig. 1. Cutting knives 28, having sharpened adjacent inner ends, are secured in said guideways by screws 30.

The inner sharpened edges of the knives 28 are provided with half-round cut-outs forming a round opening 32 in closed position of the jaws, as shown in Figs. 1 and 2. The inner edges of the jaw forming portions 8 are likewise provided with cut-outs to provide an opening 34 of larger diameter than the opening 32, and in alignment therewith.

A slitting blade 40 is disposed in the slot 22 of the right-hand block 10 and has an inner slitting end which extends across the channel 20 into the slot 24 of the left-hand block 10, when the jaws are in the closed position, as shown.

In operation, the jaws of the device are closed by the handles with the cable C in the channel 20 at a point where the conductors 16 thereof are to be bared. With the jaws held in closed position, the cable and tool are moved longitudinally relative to one another so that the slitting knife 40 slits the insulation 18 of the cable between the conductors 16, as at 40' in Fig. 4. The slit 40' may be of any length desired.

With the insulation thus split, the jaws are opened to release the cable. The outer ends of the knives 28 are closed on the insulation around a conductor in the opening 32, at an end of the slit 40'. The tool is rotated somewhat so that the inner ends of the knives 28 cut through the insulation to the conductor as at 32'. The conductor is not marred by the knives as the opening 32 is a trifle larger than the conductor and the inner abutable edges of the jaw portions 8 limit closing movement of the jaws. The insulation is cut through on each conductor at opposite ends of the slit 40'.

With the insulation cut around the ends of both conductors at opposite ends of the slit, the insulation may be removed from the conductors as in Fig. 6.

Various changes and modifications may be made in the form of the device without departing from the spirit and scope thereof and it is desired to be limited if at all by the following claims rather than the foregoing description and therefore I claim:

1. A tool for slitting to facilitate removal of encasing insulation from the separate parallel conductors of a cable held in transversely spaced relation by the insulation comprising, a pair of elongated thin and relatively flat members having upper jaws and lower handles and having portions between the jaws and handles in superposed relation and being pivoted together for relative swinging of the jaws between open and closed position, the jaws of said members having flat upper and lower faces and being bent relative to their respective handle portions whereby the planes of corresponding faces of the jaw portions are in coplanar relation, elongated blocks, means securing said blocks to corresponding faces of the jaws of said members, said blocks being provided with inner elongated faces for abutment in closed position of the jaws, said inner faces disposed outwardly of corresponding coplanar faces of the jaws and extending radially outwardly of the axis of swinging of the jaws, said inner faces of said blocks provided with longitudinally extending cooperating grooves arranged in closed position of the jaws to form an elongated channel parallel to and outwardly of the coplanar faces of the jaw for the passage of a cable therethrough and having a longitudinal axis disposed radially of the axis of swinging of the jaws, and a knife secured in one of said blocks having a slitting edge extending outwardly of the groove therein and arranged in closed position of the jaws to extend across said channel to sever insulation between the wires of a cable being drawn along said channel lengthwise of the tool.

2. A tool to facilitate removal of insulating material about spaced parallel conductors by slitting the insulation along and between the conductors comprising, a pair of elongated members having lower handles and elongated upper jaws and portions intermediate said handles and jaws being in superposed relation, a pivotal connection between said intermediate portions for the swinging of said handles and jaws between open and closed positions, said jaws having flat upper and lower faces, said jaws being bent relative to their respective handles in a direction at right angles to the axis of said pivotal connection and then bent in a direction parallel to said axis whereby the corresponding faces of said jaws are disposed in the same plane, elongated blocks secured to corresponding faces of said jaws extending outwardly along said faces having longitudinal inner faces extending radially outwardly from said pivotal connection and arranged for abutment in the closed position of said jaws, said inner faces of said blocks being provided with longitudinally extending channel grooves arranged to form in abutting relation of said inner faces of said blocks an open ended channel extending radially outwardly of said pivotal connection for the passage of a cable therethrough lengthwise of the tool, and a knife secured in one of said blocks having an outer slitting edge arranged to extend across the channel in the closed position of said jaws.

References Cited in the file of this patent

UNITED STATES PATENTS

| | | |
|---|---|---|
| 756,857 | Hutchings | Apr. 12, 1904 |
| 1,022,679 | Huston | Apr. 9, 1912 |
| 1,566,297 | Williams | Dec. 22, 1925 |
| 1,686,044 | Stott | Oct. 2, 1928 |
| 1,939,574 | Saylor | Dec. 12, 1933 |
| 2,410,252 | Torrence | Oct. 29, 1946 |